United States Patent
Hwang

(10) Patent No.: US 6,531,854 B2
(45) Date of Patent: Mar. 11, 2003

(54) POWER FACTOR CORRECTION CIRCUIT ARRANGEMENT

(75) Inventor: Jeffrey H. Hwang, Saratoga, CA (US)

(73) Assignee: Champion Microelectronic Corp., Hsinchu (TW)

(*) Notice: Subject to any disclaimer, the term of this patent is extended or adjusted under 35 U.S.C. 154(b) by 6 days.

(21) Appl. No.: 09/823,639

(22) Filed: Mar. 30, 2001

(65) Prior Publication Data

US 2002/0140407 A1 Oct. 3, 2002

(51) Int. Cl.[7] .............................................. G05F 1/40
(52) U.S. Cl. ........................ 323/285; 323/222; 323/242; 323/300
(58) Field of Search ................................. 323/222, 237, 323/242, 282, 283, 284, 285, 286, 288, 299, 300, 351

(56) References Cited

U.S. PATENT DOCUMENTS

| | | | |
|---|---|---|---|
| 3,646,439 A | * 2/1972 | Broski | 323/242 |
| 5,396,165 A | 3/1995 | Hwang et al. | 323/210 |
| 5,565,761 A | 10/1996 | Hwang | 323/222 |
| 5,592,128 A | 1/1997 | Hwang | 331/61 |
| 5,742,151 A | 4/1998 | Hwang | 323/222 |
| 5,747,977 A | 5/1998 | Hwang | 323/284 |
| 5,798,635 A | 8/1998 | Hwang et al. | 323/222 |
| 5,804,950 A | 9/1998 | Hwang et al. | 323/222 |
| 5,818,207 A | 10/1998 | Hwang | 323/288 |
| 5,894,243 A | 4/1999 | Hwang | 327/540 |
| 5,903,138 A | 5/1999 | Hwang et al. | 323/266 |
| 5,912,549 A | * 6/1999 | Farrington et al. | 323/207 |
| 6,091,233 A | 7/2000 | Hwang et al. | 323/222 |

* cited by examiner

Primary Examiner—Jessica Han
(74) Attorney, Agent, or Firm—Derek J. Westberg

(57) ABSTRACT

A power factor correction circuit arrangement. A rectified alternating-current (AC) input signal may be applied across inputs of a voltage converter circuit, such as a boost converter. Current drawn by the voltage converter may be sensed to form a first sensing signal that is representative of the current. The rectified input voltage may be converted to a second sensing signal that is representative of the AC input signal. Switching in the power converter is adjusted in a first feedback loop to equalize the first and second sensing signals and, thus, the current drawn is regulated to remain in phase with the AC input signal. A feedback signal adjusts switching so as to regulate the output voltage level of the voltage converter in a second feedback loop and, thus, controls power delivered to the load.

36 Claims, 7 Drawing Sheets

POWER FACTOR CORRECTION CIRCUIT ARRANGEMENT

FIELD OF THE INVENTION

The present invention relates to the field of power supply circuit arrangements. More particularly, the present invention relates to the field of power factor correction (PFC) circuit arrangements.

BACKGROUND OF THE INVENTION

An off-line power converter is one in which power is derived from an alternating-current (AC) power source (e.g., 120 volts AC). In such a converter, a power factor correction (PFC) technique may be used to maintain the current drawn from the AC source in phase with the AC voltage so that that the converter appears as a resistive load to the AC source. This is important for non-linear loads in order to improve the power factor and to reduce harmonics, which might otherwise be introduced to the AC source.

A typical PFC technique involves use of a switching mode power converter in which the input current is switched at a frequency that is higher than the AC line frequency and modulated so as to follow the AC voltage signal in time and amplitude proportionately. In addition, the output voltage level is typically monitored, compared to a predetermined desired level and a response is developed to more precisely attain the desired output voltage. Conventional modulation techniques include pulse-width modulation (PWM) and frequency modulation.

Efficient, economical and effective techniques for power factor correction are increasingly sought after. It is to these ends that present invention is directed.

SUMMARY OF THE INVENTION

The present invention relates to a power factor correction circuit arrangement. A rectified alternating-current (AC) input signal may be applied across inputs of a voltage converter, such as a boost converter. Current drawn by the voltage converter may be sensed to form a first sensing signal that is representative of the current. The rectified input voltage may be converted to a second sensing signal that is representative of the AC input signal. Switching in the power converter may be adjusted in a first feedback loop to equalize the first and second sensing signals and, thus, the current drawn is regulated to remain in phase with the AC input signal. A second feedback loop adjusts switching so as to regulate the output voltage level of the voltage converter and, thus, controls power delivered to the load.

In accordance with an aspect of the invention, a series-coupled resistor pair may be coupled across the inputs of the voltage converter circuit. A first input of an amplifier, such as an operational amplifier or a transconductance amplifier, may be coupled to an intermediate node of the series coupled pair, while a second input of the amplifier may be coupled to a reference voltage level (e.g., ground). Thus, the intermediate node may be held to the reference voltage level by the amplifier. Current applied to the amplifier from the intermediate node may be representative of a difference between the first and second sensing signals. Accordingly, the current applied to the amplifier may be representative of a difference between the AC input signal and the current sensing signal. An output of the amplifier may control a duty cycle of a main power switch so as to maintain the sensing signal in phase with the AC input signal. A modulation circuit coupled to the output of the voltage converter may control the amount of power delivered to a load by adjusting one of the resistors of series-coupled pair in a feedback loop.

The invention is effective to ensure that the input current follows the AC line voltage in time and amplitude proportionately and also to provide a regulated output voltage.

DETAILED DESCRIPTION OF A PREFERRED EMBODIMENT

Figure 1:
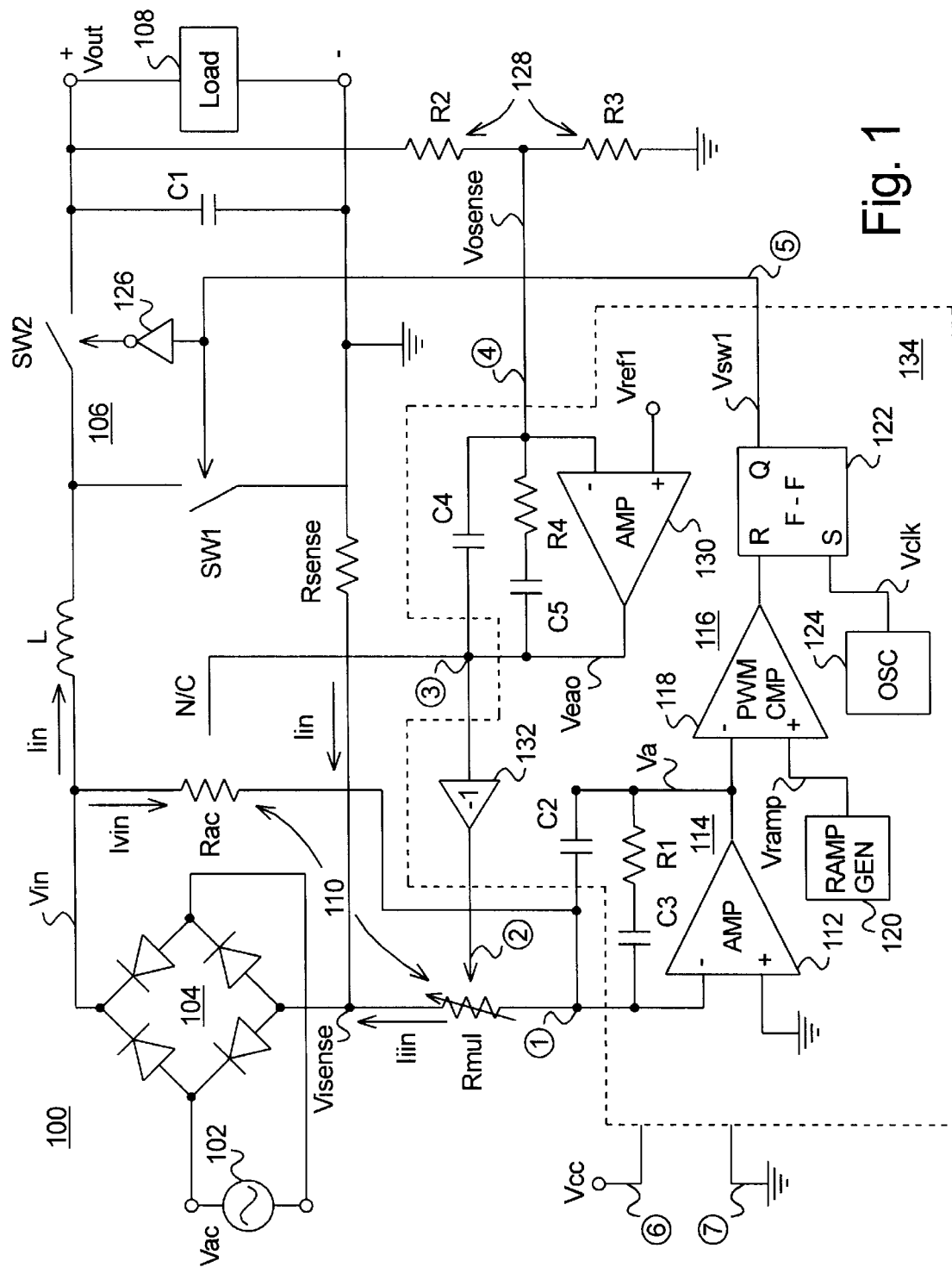
FIG. 1 illustrates a schematic diagram of a power factor correction (PFC) circuit arrangement in accordance with the present invention.

FIG. 1 illustrates a schematic diagram of a power factor correction (PFC) circuit arrangement 100 in accordance with the present invention. An alternating-current (AC) source 102 may be coupled across input terminals of a full-wave bridge rectifier 104. A voltage signal Vin may be formed at a first output terminal of the rectifier 104 and may be coupled to a first terminal of an inductor L. A second terminal of the inductor L may be coupled to a first terminal of a switch SW1 and to a first terminal of a switch SW2. A second terminal of the switch SW2 may be coupled to a first terminal of an output capacitor C1. A second terminal of the switch SW1 and a second terminal of the capacitor C1 may be coupled to a ground node.

The switches SW1, SW2, the inductor L and the capacitor C1 form a boost-type switching power converter 106. When the switch SW1 is closed, the switch SW2 is preferably open. Under these conditions, a current Iin from the rectifier 104 may flow through the inductor L and through the switch SW1, charging the inductor L with energy. Within certain limits, the longer the switch SW1 is closed, the more energy that is stored in the inductor L. When the switch SW1 is opened, the switch SW2 is preferably closed. Under these conditions, energy stored in the inductor L may be discharged through the switch SW2 into the output capacitor C1, forming an output voltage Vout across the capacitor C1. Thus, the level of power delivered to a load 108 coupled to the output capacitor C1 may be controlled by controlling the timing of opening and closing the switches SW1 and SW2, such as by pulse-width modulation or frequency modulation. The switch SW2 may be replaced by a freewheeling diode.

A series-coupled resistor pair 110, including resistors Rac and Rmul, may be coupled across the input terminals of the power converter 106. More particularly, a first input terminal of the power converter 106 may be coupled to the first output terminal of the rectifier 104 and to a first terminal of the resistor Rac. A second terminal of the resistor Rac may be coupled to a first terminal of the resistor Rmul, forming an intermediate node of the resistor pair 110. A second input terminal of the power converter 106 may be coupled to a second output terminal of the rectifier 104 and to a second terminal of the resistor Rmul.

A first terminal of a sensing resistor Rsense may also be coupled to the second output terminal of the rectifier 104. A second terminal of the resistor Rsense may be coupled to the ground node. The current Iin drawn by the power converter 106 passes through the sensing resistor Rsense before returning to the rectifier 104. Thus, a voltage Visense formed at the first terminal of the resistor Rsense is representative of the current Iin.

The intermediate node of the resistor pair 110 may be coupled to a first input terminal of an amplifier 112. The amplifier 112 may be, for example, an operational amplifier or an operational transconductance amplifier. A second input terminal of the amplifier 112 may be coupled to a reference voltage level, such as a ground node. Thus, the intermediate node of the resistor pair 110 may be held to a "virtual" ground by the amplifier 112.

Accordingly, the voltage Vin may be applied to the first terminal of the resistor Rac, while the second terminal of the resistor Rac may be held to virtual ground by the amplifier 112. As a result, the input voltage Vin is applied across the resistor Rac. Thus, a current Ivin in the resistor Rac may be representative of the input voltage Vin. In addition, the first terminal of the resistor Rmul may be held to virtual ground by the amplifier 112, while the second terminal of the resistor Rmul may be coupled to the second terminal of the sensing resistor Rsense. As a result, the voltage Visense is applied across the resistor Rmul. Thus, a current Iiin in the resistor Rmul may be representative of the input current Iin.

The amplifier 112 may be configured as part of an integrator or low pass filter 114. Accordingly, an output of the amplifier 112 may be coupled to a first terminal of a capacitor C2. A second terminal of the capacitor C2 may be coupled to the first input terminal of the amplifier 112. A series combination of a capacitor C3 and resistor R1 may also be coupled across the capacitor C2.

By applying Kirchhoff's Law to the intermediate node of the resistor pair 110, it can be seen that the instantaneous current delivered to the integrator 114 is equal to Ivin minus Iiin and is, thus, representative of a difference between the input voltage Vin and the input current Iin. The resulting integrated signal Va at the output of the integrator 114 may be coupled to control the timing of opening and closing the switches SW1 and SW2. Thus, the switches SW1 and SW2 may be controlled in a feedback loop such that the current (Ivin−Iiin) delivered to the integrator 114 tends to be forced to zero. As a result, the input current Iin is maintained substantially in phase with the input voltage Vin.

The embodiment illustrated in FIG. 1 employs a pulse width modulator 116 for controlling the switches SW1 and SW2. More particularly, the output Va of the amplifier 114 may be coupled to a first input of a comparator 118. A ramp generator 120 may form a periodic ramp signal Vramp, which is coupled to a second input of the comparator 118. An output of the comparator 118 may be coupled to a reset input of a flip-flop or latch 122. An oscillator 124 may form a clock signal Vclk, which is coupled to a set input of the flip-flop 122. A Q output of the flip-flop 122 may form a switch control signal Vsw1, which is coupled to control the switch SW1. The switch control signal Vsw1 may also be coupled to an input of an inverter 126. An output of the inverter 126 may control the switch SW2.

The signal Vsw1 may be set to a logical high voltage level upon a leading edge of each pulse in the clock signal Vclk. When the ramp signal Vramp exceeds the signal Va from the amplifier 112, the output of the comparator 118 may reset the flip-flop 112 such that the switch control signal Vsw1 returns to a logical low voltage level. Thus, as the signal Va increases, the duty cycle of the switch SW1 increases, thereby increasing the current Iin. Increasing the current Iin tends to increase the current Iiin by holding Visense to a lower level. This tends to decrease the level of the signal Va. Alternately, as the signal Va decreases, the duty cycle of the switch SW1 decreases, thereby decreasing the current Iin. Decreasing the current Iin tends to increase the signal Va. Thus, the duty cycle of the switch SW1 is controlled with negative feedback to maintain the input current Iin in phase with the input voltage Vin. It will be apparent that leading or trailing edge modulation techniques may be utilized and that other types of modulation may be used, such as frequency modulation.

Figure 2:
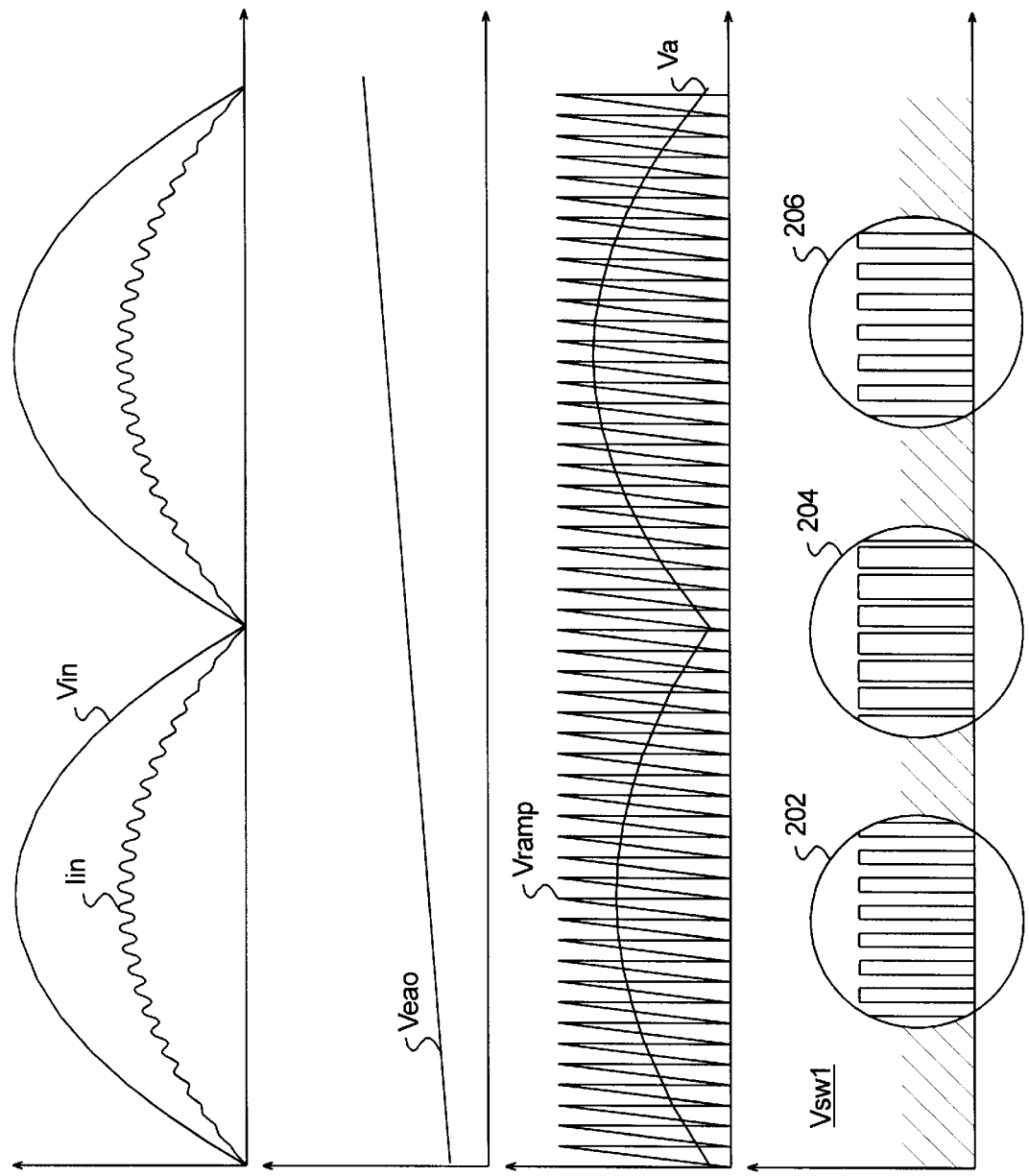
FIGS. 2A–D illustrate timing diagrams for selected signals of the PFC circuit of FIG. 1.

FIGS. 2A–D illustrate timing diagrams for selected signals of the PFC circuit of FIG. 1. More particularly, FIG. 2A illustrates the input voltage signal Vin along with the input current signal Iin. As shown in FIG. 2A, the input current signal Iin may experience some ripple caused by switching in the power converter 106. However, the current signal Iin is preferably maintained substantially in phase with the input voltage signal Vin, as explained above. Accordingly, the current drawn by the PFC converter 100 from the AC power source 102 is maintained substantially in phase with the AC voltage signal provided by the source 102.

In addition, the output voltage Vout may be regulated. To sense the output voltage level, a resistive divider 128, including resistors R2 and R3, may be coupled to the output capacitor C1. More particularly, a first terminal of the resistor R2 may be coupled to a first terminal of the capacitor C1. A second terminal of the resistor may be coupled to a first terminal of the resistor R3. A second terminal of the resistor R3 may be coupled to a ground node.

A voltage signal Vosense, which is representative of the output voltage Vout, may be formed at the intermediate node of the resistive divider 128. The signal Vosense may be coupled to a first input terminal of an amplifier 130, such as an operational amplifier or an operational transconductance amplifier. A reference voltage level Vref1 that is representative of a desired level for the output voltage Vout, may be coupled to a second input terminal of the amplifier 130. An output of the amplifier 130 may be coupled to a first terminal of a capacitor C4. A second terminal of the capacitor C4 may be coupled to the first input terminal of the amplifier 130. In addition, a series combination of a capacitor C5 and a resistor R4 may be coupled across the capacitor C4. The amplifier 130 forms an error signal Veao, which is representative of the output voltage Vout. More particularly, the error signal Veao may be representative of a difference between the output voltage Vout and a desired level for the output voltage.

The error signal Veao may be used to control the value of the resistor Rmul. More particularly, the error signal Veao may be coupled to an input of an amplifier 132. An output of the amplifier 132 may then be coupled to control the resistor Rmul. The amplifier 132 may be an inverting amplifier such that its output is representative of the signal Veao and of opposite polarity. For example, the resistor Rmul may be implemented as a series combination of a resistor and a transistor with the base or gate of the transistor coupled to be controlled by the output of the amplifier 132.

The output voltage Vout may be regulated in a feedback loop. More particularly, as the output voltage Vout increases, the level of the error signal Veao may decrease. As a result, the resistance value of the resistor Rmul may be decreased. This tends to increase the level of the current Iiin drawn from the input of the integrator 114, which tends to reduce level of the signal Va. Reducing the level of the signal Va, in turn, tends to reduce the period of time in which switch SW1 is closed for each cycle of the clock signal Vclk. As a result, the amount of power delivered to the load 108 is reduced.

Conversely, as the output voltage Vout decreases, the level of the error signal Veao may increase. FIG. 2B illustrates the error signal Veao formed at the output of the amplifier 130. The error signal Veao is shown in FIG. 2B to be increasing, as would occur if the output voltage Vout was decreasing. The slope of the signal Veao may be somewhat exaggerated in FIG. 2B for illustration purposes. As a result, the resistance value of the resistor Rmul may be increased. This decreases the level of current drawn from the input of the integrator 114 and, thus, the level of the signal Va may increase. FIG. 2C illustrates the periodic ramp signal Vramp, along with the integrated signal Va formed by the integrator 114. As shown in FIG. 2C, the signal Va is increasing in response to the increasing level of Veao. Similarly to the error signal Veao, the variations in the signal Va may be somewhat exaggerated in FIG. 2C for illustration purposes. As shown in FIG. 2C, the signal Va also tends to follow the rectified input voltage Vin so as to maintain the input current Iin substantially in phase with the input voltage Vin.

As a result of the increasing level of Veao, the period of time that the switch SW1 is closed for each cycle of the clock signal Vclk will tend to increase. In addition, the period of time the switch SW1 is closed for each cycle of clock signal Vclk tends to be shorter when the input voltage Vin is at a higher level and longer when the input voltage is at a lower level. FIG. 2D illustrates the switch control signal Vsw1. For illustration purposes, the switch control signal Vsw1 is shown magnified in areas 202, 204 and 206. In the first area 202, the signal Vsw1 has lower duty cycle than in the areas 204 and 206. This is because the first area 202 corresponds to a lower level of the signal Va and to a higher level of the input voltage Vin. As shown by the second area 204, when the input voltage Vin increases, so does the duty cycle of the switch SW1. The third area 206 corresponds to a higher level of the input voltage Vin and to a higher level of the signal Va. Thus, the duty cycle in area 206 is higher than the area 202, but lower than the area 204. As explained above, the increasing duty cycle, such as with respect to the area 202, will tend to increase the power provided to the load 108 and will, thus, tend to increase the level of the output voltage Vout. Conversely, if the output voltage Vout rises, reducing the duty cycle of the switch SW1 will reduce the level of power delivered to the load 108. Thus, the output voltage Vout is regulated to a substantially constant level.

The ramp signal Vramp is shown in FIG. 2C as having a constant amplitude that is reached during each cycle just prior to the ramp signal returning to a low level. In which case, the ramp generator 120 may be a conventional ramp generator that charges a storage element, such as a capacitor, to a fixed value and then rapidly discharges the storage element for each cycle of the ramp signal. Alternately, the ramp signal Vramp may have varying amplitude. In which case, the ramp generator 120 may charge a storage element to a level that is representative of the rectified AC supply voltage prior to discharging the storage element. U.S. Pat. No. 5,592,128, the contents of which are hereby incorporated by reference, describes as example of such a ramp signal generator.

The PFC converter 100 includes a controller 134 and external circuitry. For example, the elements of FIG. 1 that are enclosed by the dotted line may be included within the controller 134, while the remaining elements may be external to the controller 134. In a preferred embodiment, the controller 134 is implemented as an integrated circuit chip. Pins of the integrated circuit package provide nodes for coupling circuitry of the controller 134 to the external circuitry. Seven pins may be utilized, as shown in FIG. 1 by the circled numbers 1–7. More particularly, a first pin may be provided at the first input terminal of the amplifier 112; a second pin may be provided at the output of the amplifier 132; a third pin may be provided at the output of the amplifier 130; a fourth pin may be provided at the first input terminal of the amplifier 130; a fifth pin may be provided at the Q output of the flip-flop 122; a sixth pin may be coupled to internal circuitry of the integrated circuit for providing power (e.g., supply voltage Vcc); and a seventh pin may be coupled to internal circuitry of the integrated circuit for providing a ground node.

Figure 3:
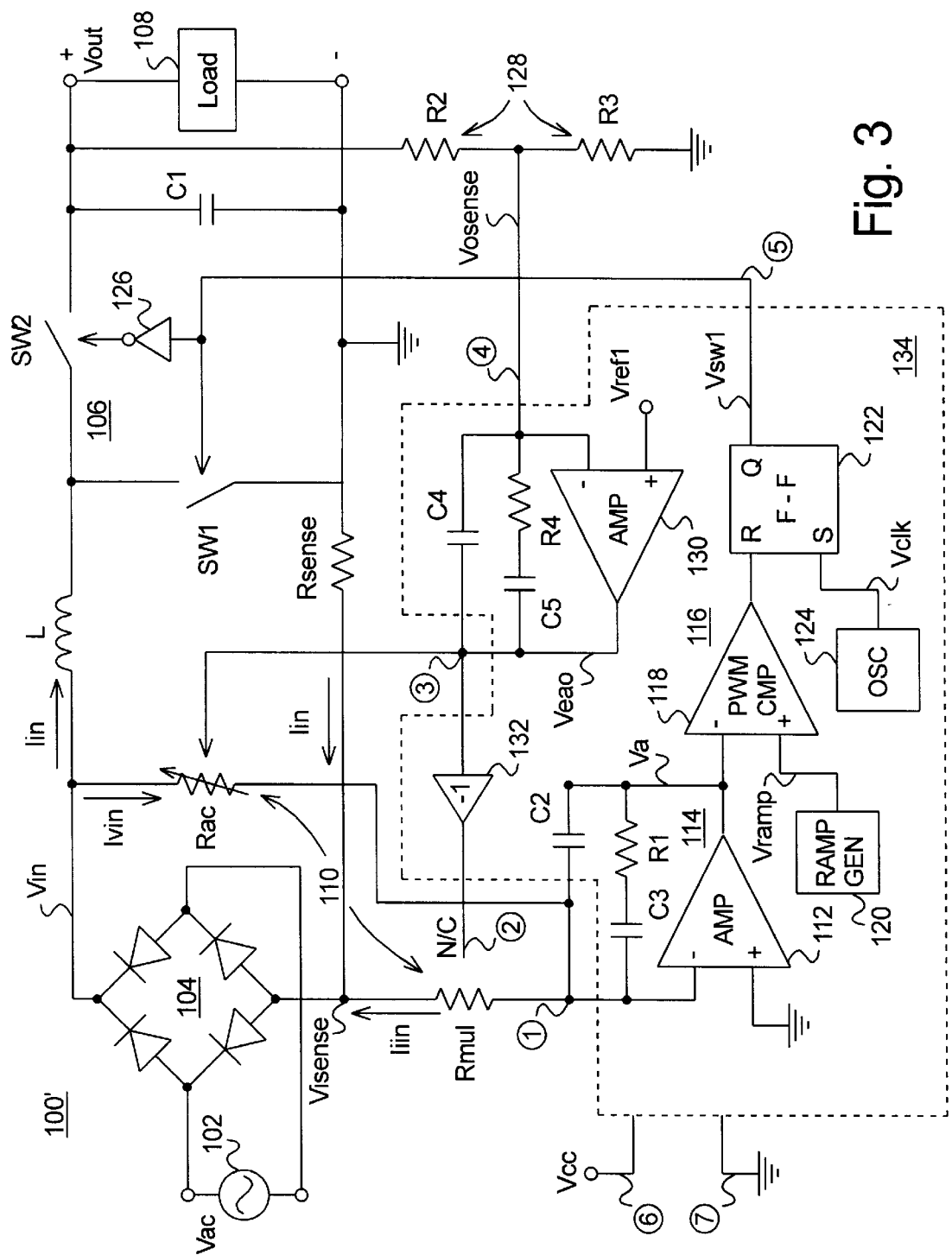
FIG. 3 illustrates a schematic diagram of a first alternate embodiment of the PFC circuit arrangement of FIG. 1.
Figure 6:
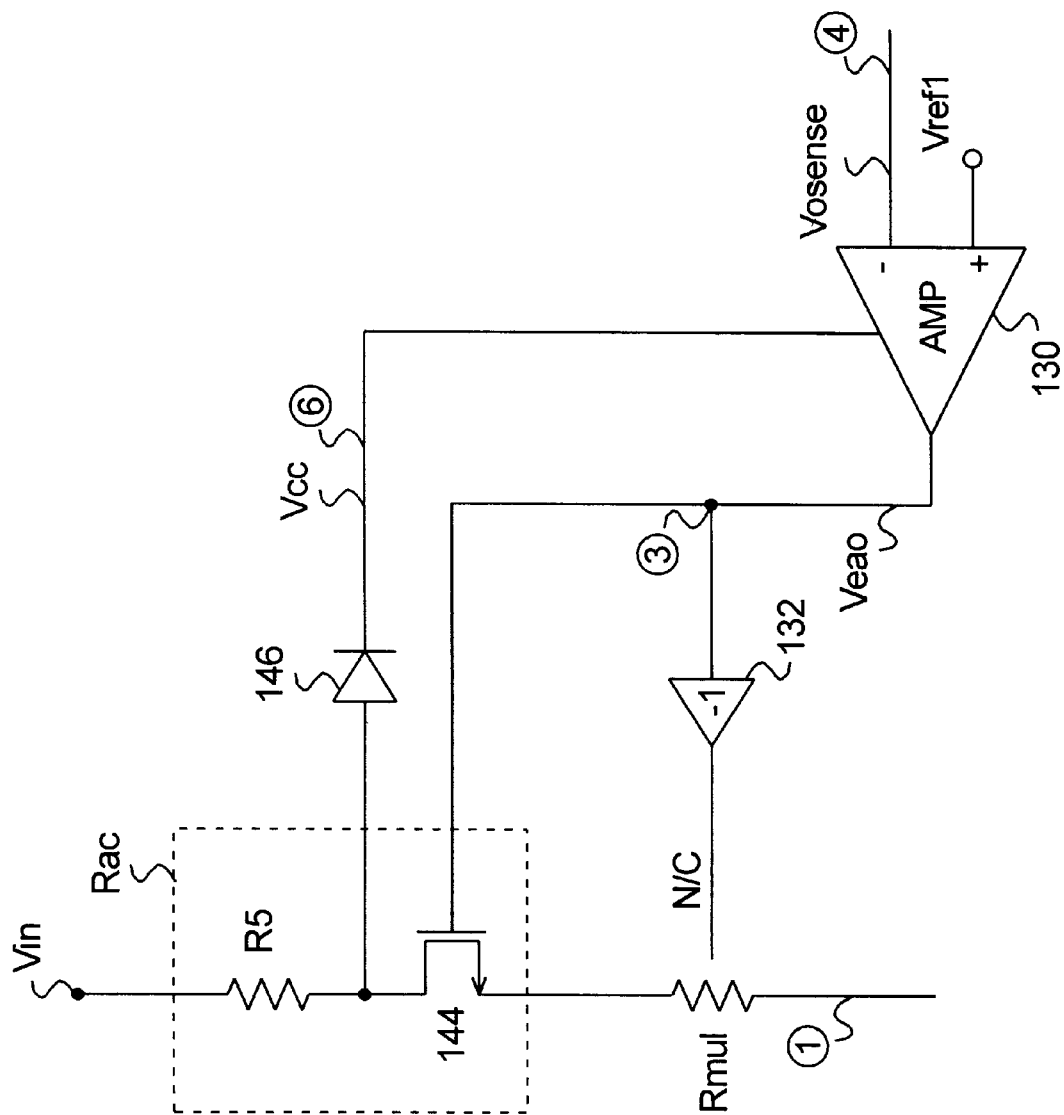
FIG. 6 illustrates a schematic diagram of a portion of the converter of FIG. 3 including an arrangement for providing power to the controller during start-up.
Figure 7:
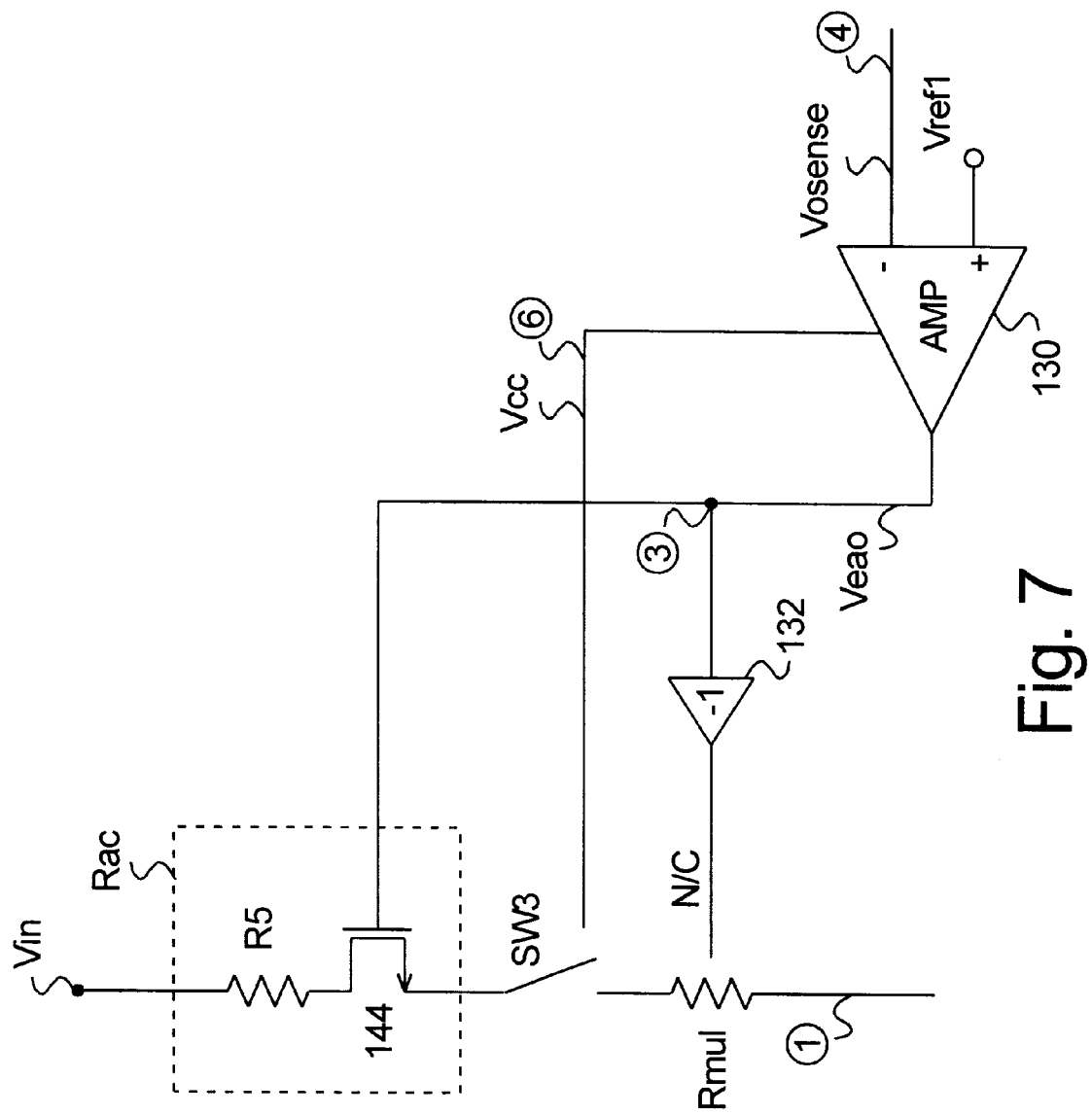
FIG. 7 illustrates a schematic diagram of a portion of the converter of FIG. 3 including an alternate arrangement for providing power to the controller during start-up.

FIG. 3 illustrates a schematic diagram of an alternate embodiment of a PFC circuit arrangement 100'. Elements of FIG. 3 having a one-to-one functional correspondence with those of FIG. 1 are given the same reference character. Recall that in FIG. 1, the resistor Rmul is preferably adjustable, while the resistor Rac is a fixed value. The PFC converter 100' of FIG. 3 differs from that of FIG. 1 in that the resistor Rac is preferably adjustable, while the resistor Rmul is a fixed value. So that the value of the resistor Rac of FIG. 3 is adjusted appropriately, the output signal Veao of the amplifier 130 may be used to control the resistor Rac, rather than the inverted signal formed by the amplifier 132, as in FIG. 1. Similarly to the resistor Rmul, the resistor Rac may be implemented as a series combination of a fixed resistor and a transistor, as shown in FIGS. 6 and 7. In addition, it will be apparent that both resistors Rac and Rmul could be made to be adjustable.

Figure 4:
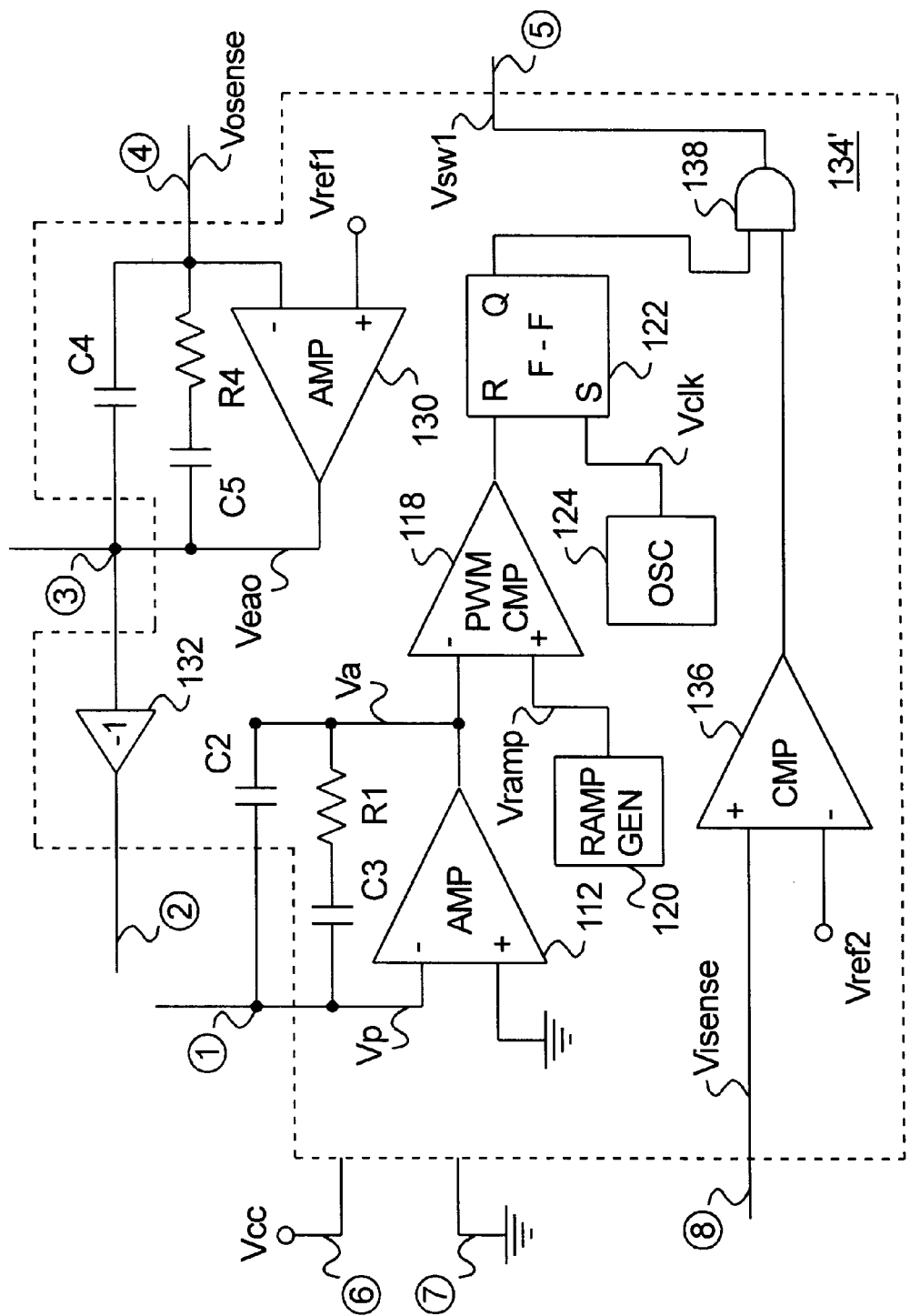
FIG. 4 illustrates schematic diagram of an embodiment of the PFC controller of FIG. 1 including current-limiting circuitry.

Because integrated circuits generally include an even number of pins, a pin may be added to the above-described seven pins of the controller 134 for performing one or more additional functions. For example, as shown in FIG. 4, a pin may be added for ensuring that the input current Iin does not exceed a predetermined value, which might otherwise damage elements of the PFC converter 100. In which case, an additional eighth pin (shown in FIG. 4 by the circled number 8) may be coupled to the first terminal of the sensing resistor Rsense for sensing the level of the signal Visense formed at this node. The signal Visense may be compared to a predetermined reference voltage Vref2 by a comparator 136. Thus, the eighth pin may be coupled to a first input terminal of the comparator 136 while the reference voltage Vref2 may be coupled to a second input of the comparator 136. An output of the comparator 136 may be coupled to a first input terminal of a logic AND gate 138. The Q output of the flip-flop 122 may be coupled to a second input terminal of the gate 138. An output of the gate 138 may then form the switch control signal Vsw1. The comparator 136 may provide some hysteresis so as to avoid disabling the switch SW1 too frequently.

Under normal circumstances, the signal Visense is a negative value higher than Vref2. Accordingly, the output of the comparator 136 is logic high voltage and the AND gate 138 passes the Q output signal generated by the flip-flop 122. However, if an over-current condition occurs in which the current Iin exceeds a particular level, the signal Visense may fall below the level of Vref2. As a result, the output of the comparator 136 transitions to a logic low voltage. This causes the output of the AND gate 138 to be a logic low voltage. As a result, the switch SW1 may be disabled from switching and held open until the input current Iin is reduced to a level such that the output of the comparator 136 returns to a logic high voltage.

In an alternate embodiment, the resistors Rmul and Rac may both be fixed values. In which case, an alternate scheme may be used for regulating the output voltage Vout. For example, operation of the switch SW1 may cease once the output voltage exceeds a first predetermined value until the output voltage falls below a second predetermined value that is lower that the first predetermined value. Thus, the output voltage Vout may be regulated to remain between the first and second predetermined values.

Figure 5:
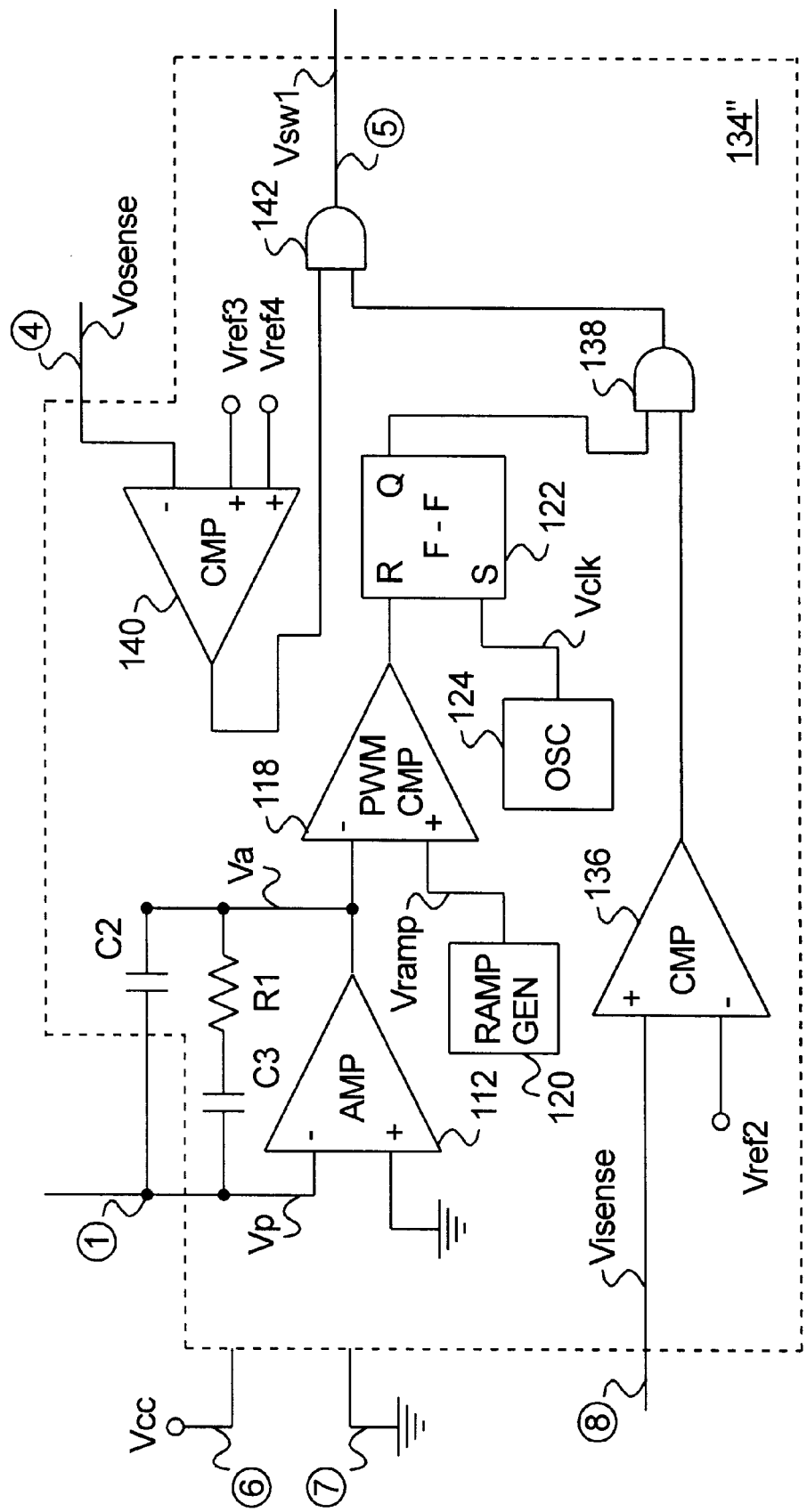
FIG. 5 illustrates a schematic diagram of a second alternate embodiment of the PFC circuit arrangement of FIG. 1.

FIG. 5 illustrates a schematic diagram of an alternate embodiment of the controller 134", which may be utilized when the resistors Rac and Rmul are fixed values. Elements of FIG. 5 having a one-to-one functional correspondence with those of FIG. 4 are given the same reference numeral. The signal Vosense may be coupled to a first input of a comparator 140. A reference voltage Vref3, may be coupled to a second input of the comparator 140. A reference voltage Vref4 may be coupled to a third input of the comparator 140. An output of the comparator 140 may be coupled to a first input terminal of a logic AND gate 142, while an output of the logic AND gate 138 may be coupled to a second input terminal of the AND gate 142. The switch control signal Vsw1 may be formed at the output of the AND gate 142.

Thus, when the switch SW1 is actively switching and the output voltage Vout exceeds a first predetermined value, e.g. 400 volts DC, the signal Vosense may exceed the value of Vref3. As a result, the output of the comparator 140 changes from a logic high voltage to a logic low voltage. This causes the output of the AND gate 142 to be a logic low voltage. As a result, the switch SW1 is disabled from switching and held open. Eventually, the output voltage Vout will fall since the load 108 will continue to draw current from the output capacitor C1. When the output voltage Vout falls below a second predetermine value, e.g., 380 volts DC, the signal Vosense may fall below the value of Vref4. As a result, the output of the comparator 140 changes from a logic low voltage to a high voltage. This causes the switch SW1 to begin switching again until it reaches the first predetermined value again. This cycle may continue with the output voltage rising and falling approximately between the first and second predetermined values.

Under these conditions, the output voltage Vout may vary over a range of values, for example, between approximately 380 and 400 volts DC. It will be apparent, however, that by adjusting the values of Vref3, Vref4, R2 or R3, this range may be altered. A range of values for the output voltage Vout may be acceptable since Vout may be used as a supply for a second power converter stage. For example, the second power converter stage may be a DC-to-DC converter, such as a buck converter, which may provide a voltage that is lower than Vout.

Elements of the controllers 134 or 134' of FIGS. 1, 3 and 4 may be omitted from the controller 134" of FIG. 5 since they are not needed for controlling the resistors Rac and Rmul. Accordingly, as illustrated in FIG. 5, the pins 2 and 3 and amplifiers 130 and 132 are omitted. However, elements of the controllers 134 or 134' may be included in the controller 134" so that a single configuration of the integrated circuit chip controller may be utilized for the various embodiments in which one, both or neither of the resistors Rac and Rmul is adjustable.

The supply voltage Vcc, which provides power for operating the controller 134 (or controllers 134' or 134"), may be derived from the output Vout. However, when the converter 100 is activated, a charge needs to be built up on the capacitor C1 before sufficient voltage is available to provide power to elements of the controller 134. Accordingly, power for the controller 134 may be derived from the input voltage Vin until the output voltage Vout rises.

FIG. 6 illustrates a schematic diagram of a portion of the converter 100' of FIG. 3 including an arrangement for providing power to the controller 134 during start-up. In addition, FIG. 6 illustrates the resistor Rac implemented as a series combination of a fixed resistor R5 and a transistor 144. The transistor 144 may be a bipolar or field-effect transistor having its base or gate controlled by the output of the amplifier 130. The resistor R5 may have a first terminal coupled to receive the input voltage Vin and a second terminal coupled to the transistor 144. The transistor 144 may also be coupled to the resistor Rmul. An anode of a diode 146 may be coupled to a node between the resistor R5 and the transistor 144.

A cathode of the diode 146 may be coupled to a node of the Vcc supply for providing power to circuitry of the controller 134, such as the amplifier 130 and other elements. Thus, during start-up, when the level of the Vcc supply is low, the diode 146 is forward biased. Under these conditions, current flowing from the supply Vin flows through the diode 146 and provides operating power for the controller 134. Once the level of the Vcc supply voltage rises sufficiently, the diode 146 may be reverse biased, so as to isolate Vcc from the input voltage Vin.

FIG. 7 illustrates a schematic diagram of a portion of the converter 100' of FIG. 3 including an alternate arrangement for providing power to the controller 134 during start-up. FIG. 7 differs from FIG. 6 in that the diode 146 is omitted and, instead, a switch SW3 is placed so as to selectively couple the transistor 144 to the resistor Rmul or to a node of the Vcc supply. During start-up, when the level of the supply Vcc is low, the switch SW3 couples the transistor 144 to a node of the Vcc supply. Under these conditions, current from the supply Vin flows through the switch SW3 and provides power for the controller 134. Once the level of the Vcc supply voltage rises sufficiently, the switch SW3 may decouple the transistor 144 from the Vcc supply and, instead, the switch SW3 may couple the transistor 144 to the resistor Rmul. The switch SW3 may be implemented, for example, as a transistor with its base or gate coupled to be activated according to a level of the supply voltage Vcc.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A power factor correction converter, comprising:
   a switch for modulating an input current received from a rectified alternating-current supply so as to form an output voltage across an energy storage element in response to a switch control signal;
   a series-coupled resistor pair coupled across inputs of the alternating-current supply and having an intermediate node;
   a first feedback loop for forming the switch control signal in response to a signal formed at the intermediate node; and a second feedback loop for adjusting a resistance of the series-coupled resistor pair in response to a level of the output voltage.

2. The power factor correction converter according to claim 1, further comprising a current sensing resistor coupled between a ground node and one of the inputs of the alternating-current supply.

3. The power factor correction converter according to claim 2, wherein the intermediate node is held to a virtual ground level.

4. The power factor correction converter according to claim 1, wherein the first feedback loop comprises an integrator coupled to receive the signal formed at the intermediate node.

5. The power factor correction converter according to claim 1, wherein a comparator compares an integrated signal formed by the integrator to a periodic ramp signal.

6. The power factor correction converter according to claim 5 wherein the periodic ramp signal has a fixed amplitude.

7. The power factor correction converter according to claim 5 wherein the periodic ramp signal has a varying amplitude that is representative of a level of the alternating current supply.

8. The power factor correction converter according to claim 1, wherein the adjusted resistance of the series coupled resistor pair comprises a fixed resistor coupled in series with a transistor.

9. The power factor correction converter according to claim 8, including an integrated circuit controller and further comprising means for providing operating power for the integrated circuit controller under start-up conditions, wherein the means for providing is coupled to the transistor.

10. The power factor correction converter according to claim 9, wherein the means for providing comprises a diode, wherein the diode passes current from the rectified alternating current supply under start-up conditions and wherein the diode is reverse biased after start-up.

11. The power factor correction converter according to claim 10, where the means for providing comprises a switch wherein the switch passes current from the rectified current supply for providing power to the integrated circuit under start-up conditions and wherein the switch passes current from the rectified current supply to the intermediate node after start-up.

12. A method of performing power factor correction, comprising:
forming a first sensing signal representative of an input current received from an alternating-current supply;
forming a second sensing signal representative of an input voltage received from the supply;
equalizing the first and second sensing signals in a first feedback loop so as to maintain the input current in phase with the input voltage; and
adjusting a level of one of the first and second sensing signals in a second feedback loop so as to regulate an output voltage.

13. The method according to claim 12, where said equalizing comprises modulating a power switch coupled to receive the input current.

14. The method according to claim 13, wherein said equalizing further comprises integrating a signal representative of a difference between the first and second sensing signals.

15. The method according to claim 14, wherein said equalizing further comprises forming the signal representative of the difference between the first and second sensing signals at a virtual ground node.

16. The method according to claim 14, wherein said equalizing further comprises comparing the integrated signal to a periodic ramp signal and wherein a duty cycle of the switch is controlled by results of said comparing.

17. The method according to claim 12, wherein said adjusting comprises modulating a resistance value.

18. The method according to claim 17, wherein a current passing through the resistance value contributes to one of the first or second sensing signals.

19. The method according to claim 17, wherein said modulating comprises:
forming an error signal representative of the output voltage; and
controlling a transistor based upon a level of the error signal.

20. A method of performing power factor correction, comprising:
forming a first sensing signal representative of an input current received from a alternating-current supply;
forming a second sensing signal representative of an input voltage received from the supply;
forming a difference signal representative of a difference between the first sensing signal and the second sensing signal; and
forming a switch control signal in response to the difference signal for modulating the input current so as to maintain the input current in phase with the input voltage.

21. The method according to claim 20, further comprising disabling the switch control signal upon an output voltage reaching a first predetermined level and enabling the switch control signal upon the output voltage falling to a second predetermined level, wherein the second predetermined level is lower than the first predetermined level.

22. The method according to claim 21, further comprising integrating the difference signal thereby forming an integrated signal.

23. The method according to claim 22, further comprising:
comparing the integrated signal to a periodic ramp signal; and
forming the switch control signal in response to said comparing.

24. The method according to claim 23 wherein the periodic ramp signal has a fixed amplitude.

25. The method according to claim 24 wherein the periodic ramp signal has a varying amplitude that is representative of a level of the alternating current supply.

26. A controller for power factor correction converter, comprising:
switch modulation circuitry for modulating an input current received from an alternating-current supply so as to form an output voltage across an energy storage element;
output voltage regulating circuitry coupled to the switch modulation circuitry for disabling switching upon the output voltage reaching a first predetermined level and for enabling switching upon the output voltage falling to a second predetermined level, wherein the second predetermined level is lower than the first predetermined level; and
input voltage and current sensing circuitry coupled to the switch modulation circuitry for maintaining the input current in phase with the input voltage in a feedback loop, wherein the input voltage and current sensing circuitry receives a control signal formed at a virtual ground node, the control signal being representative of a difference between the input current and the input voltage.

27. The controller according to claim 26, further comprising an integrator coupled to receive the control signal formed at the virtual ground node.

28. The controller according to claim 27, further comprising a comparator for comparing an integrated signal formed by the integrator to a periodic ramp signal and for generating the switch control signal in response to results of the comparison.

29. The controller according to claim 28, wherein the controller is implemented as an integrated circuit having no more than eight pins.

30. The controller according to claim 29, wherein the controller includes means for disabling switching in the event of an over-current condition.

31. A controller for power factor correction converter, comprising:

switch modulation circuitry for modulating an input current received from an alternating-current supply so as to form an output voltage across an energy storage element;

input voltage and current sensing circuitry coupled to the switch modulation circuitry for maintaining the input current in phase with the input voltage in a feedback loop, wherein the input voltage and current sensing circuitry forms a first sensing signal representative of an input current received from a alternating-current supply, a second sensing signal representative of an input voltage received from the supply and a difference signal representative of a difference between the first sensing signal and the second sensing signal; and output voltage regulating circuitry coupled to the switch modulation circuitry for forming an error signal representative of the output voltage and for adjusting a level of one of the first and second sensing signals in response to the error signal.

32. The controller according to claim 31, further comprising an integrator coupled to receive the difference signal.

33. The controller according to claim 32, further comprising a comparator for comparing an integrated signal formed by the integrator for a periodic ramp signal and for generating the switch control signal in response to results of the comparison.

34. The controller according to claim 33, wherein the controller is implemented as an integrated circuit having no more than eight pins.

35. The controller according to claim 34, wherein the output voltage regulating circuitry comprises means for disabling switching upon the output voltage reaching a first predetermined level and for enabling switching upon the output voltage falling to a second predetermined level, wherein the second predetermined level is lower than the first predetermined level.

36. The controller according to claim 34, wherein the controller includes means for disabling switching in the event of an over-current condition.

* * * * *